(12) United States Patent
Low (10) Patent No.: US 10,438,761 B2
(45) Date of Patent: Oct. 8, 2019

(54) DEPRESSIBLE KEYS AND KEYBOARDS (71) Applicant: RAZER (ASIA-PACIFIC) PTE. LTD., Singapore (SG)

(72) Inventor: Kok Kiong Low, Singapore (SG)

(73) Assignee: RAZER (ASIA-PACIFIC) PTE. LTD., Singapore (SG)

(*) Notice: Subject to any disclaimer, the term of this patent is extended or adjusted under 35 U.S.C. 154(b) by 0 days.

(21) Appl. No.: 15/736,680

(22) PCT Filed: Jun. 16, 2015

(86) PCT No.: PCT/SG2015/050163
§ 371 (c)(1),
(2) Date: Dec. 14, 2017

(87) PCT Pub. No.: WO2016/204690
PCT Pub. Date: Dec. 22, 2016

(65) Prior Publication Data
US 2018/0190447 A1 Jul. 5, 2018

(51) Int. Cl.
*H01H 13/7065* (2006.01)
*G06F 3/02* (2006.01)
*H01H 3/12* (2006.01)

(52) U.S. Cl.
CPC ....... *H01H 13/7065* (2013.01); *G06F 3/0202* (2013.01); *H01H 3/125* (2013.01)

(58) Field of Classification Search
CPC .... H01H 13/7065; H01H 3/125; H01H 13/20; H01H 3/14; H01H 13/70; H01H 13/705; G06F 3/0202

USPC ........ 200/341, 344, 314, 517, 5 A, 513, 345
See application file for complete search history.

(56) References Cited

U.S. PATENT DOCUMENTS

| 4,433,225 | A | | 2/1984 | Cowles | |
|---|---|---|---|---|---|
| 5,278,371 | A | * | 1/1994 | Watanabe | H01H 3/125 200/344 |
| 5,278,374 | A | * | 1/1994 | Takagi | H01H 3/125 200/344 |
| 5,280,147 | A | * | 1/1994 | Mochizuki | H01H 3/125 200/344 |
| 5,597,067 | A | * | 1/1997 | Yoneyama | H01H 3/125 200/344 |
| 5,668,358 | A | | 9/1997 | Wolf et al. | |
| 7,842,895 | B2 | * | 11/2010 | Lee | H01H 13/705 200/314 |

(Continued)

FOREIGN PATENT DOCUMENTS

| CN | 1445805 A | 10/2003 |
|---|---|---|
| CN | 2636321 Y | 8/2004 |

(Continued)

OTHER PUBLICATIONS

Extended European Search Report dated Jun. 22, 2018, 7 pages, for the corresponding European Patent Application No. 15895763.9.

(Continued)

*Primary Examiner* — Edwin A. Leon
(74) *Attorney, Agent, or Firm* — Polsinelli PC (57) ABSTRACT

According to various embodiments, a depressible key may be provided. The depressible key may include: a keytop; a scissors mechanism connected to the keytop; and a mechanical switch connected to the scissors mechanism.

18 Claims, 10 Drawing Sheets

(56) References Cited

U.S. PATENT DOCUMENTS

| | | |
|---|---|---|
| 8,981,243 B2* | 3/2015 | Leong .................... H01H 3/125 |
| | | 200/341 |
| 2002/0092750 A1 | 7/2002 | Hsu et al. |
| 2003/0213685 A1 | 11/2003 | Hsu |
| 2011/0203912 A1 | 8/2011 | Niu |
| 2013/0220786 A1 | 8/2013 | Niu |
| 2014/0251772 A1 | 9/2014 | Welch et al. |
| 2015/0090570 A1 | 4/2015 | Kwan et al. |
| 2015/0090571 A1* | 4/2015 | Leong .................... H01H 13/83 |
| | | 200/5 A |
| 2015/0136573 A1* | 5/2015 | Peterson ................ H01H 13/83 |
| | | 200/314 |

FOREIGN PATENT DOCUMENTS

| | | |
|---|---|---|
| TW | M497845 U | 3/2015 |
| WO | 2015/047606 A1 | 4/2015 |

OTHER PUBLICATIONS

Office Action (including English Translation) dated Mar. 14, 2019, for the corresponding Chinese Application No. 201580081812.6. in 12 total pages.
Office Action (including translation thereof) dated Jun. 27, 2019, in 11 total pages, for the corresponding Taiwanese Patent Application No. 105117192.

* cited by examiner

DEPRESSIBLE KEYS AND KEYBOARDS

TECHNICAL FIELD

Various embodiments generally relate to depressible keys and keyboards.

BACKGROUND

Commonly used laptop keyboards or portable keyboards employ a dome switch technology for its keys. A dome switch keyboard includes at least a key cap, a layered electrical membrane and an elastic dome disposed between the key cap and the layered electrical membrane. When a key cap is depressed, the uppermost portion of the elastic dome is displaced downward and contacts the layered electrical membrane to cause a switching operation or event. When the key cap is released, the uppermost portion of the elastic dome returns to its original position and forces the key cap to return to its original position. The dome switch is used for each of its individual keys (i.e. a rubber dome membrane construction), and does not provide positive feel, and feels "mushy" during game play. These keyboards are generally quiet and the keys require relatively low actuation force. Dome switch keyboards are relatively not as tactile due to the cushioning that is inherent in its design non-portable keyboards. Tactility, when used in reference to keyboards, refers to the feedback that a user receives when typing, particularly associated with the position along the key travel when a keystroke is generated. This feedback can be audible (i.e. a click sound), tactile (i.e. an increase in the resistance during key travel) and visual (seeing the fingers depress the key and spring back up with the keycap).

It is often desirable to make laptop and portable keyboards thinner. One design challenge associated with these portable computing devices, arises from a number of conflicting design goals that includes the desirability of making the device thinner while maintaining desired user functionality catered for gaming. When a device is made thinner, the total travel distance (i.e., from the key cap's natural position to its furthest depressed position) may need to be shorter. However, a shorter travel distance means a more restricted range of movement of the elastic dome, which may interfere with the tactile feedback to the user. Therefore, it would be beneficial to provide a keyboard for a portable computing device that is thin and aesthetically pleasing, and yet providing the tactility that gamers require.

SUMMARY OF THE INVENTION

According to various embodiments, a depressible key may be provided. The depressible key may include: a keytop; a scissors mechanism connected to the keytop; and a mechanical switch connected to the scissors mechanism.

According to various embodiments, a keyboard may be provided. The keyboard may include a plurality of depressible keys like described above.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The reference to any prior art in this specification is not, and should not be taken as an acknowledgement or any form of suggestion that the referenced prior art forms part of the common general knowledge in Australia (or any other country).

In order that the invention may be readily understood and put into practical effect, particular embodiments will now be described by way of examples and not limitations, and with reference to the figures.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

The term "coupled" (or "connected") herein may be understood as electrically coupled or as mechanically coupled, for example attached or fixed or attached, or just in contact without any fixation, and it will be understood that both direct coupling or indirect coupling (in other words: coupling without direct contact) may be provided.

Commonly used laptop keyboards employ a dome switch technology which comprises a scissor-type rubber dome membrane construction (i.e. a rubber dome membrane construction), which does not provide positive feel, and feel "mushy" during game play. A typical dome switch keyboard comprises a scissor-type assembly on a rubber dome membrane. Scissor-type switches typically have a shorter total key travel distance, which is about 1.5-2 mm per key stroke instead of about 3.5-4 mm for standard dome switch key switches. Therefore, scissor type switch keyboards are usually found on laptop computers and other 'thin-profile' devices. They are also generally quiet and require relatively low actuation force.

Laptops (in other words: notebook computers) use rubber membrane under the keys for lightweight considerations; however, gamers prefer the mechanical switch feel used in traditional non-notebook computer keyboards. Mechanical switches used in traditional non-laptop keyboards have a mechanical switch beneath each individual key. Each switch comprises a base, a spring and a stem. Depending on the resistance of the spring, the actuation force of each key can be varied by the manufacturer to provide for different tactile feels and responsiveness for different group of users. Even if in a notebook computer, a mechanical switch would be used using the traditional plunger type keys, during pressing of the key, at various positions of the keytop, the feeling may not be the same like in commonly used stand-alone keyboards, and the keys could jam. According to various embodiments, improved keys and improved keyboards may be provided.

According to various embodiments, a mechanical switch with a scissor key construction may be provided.

According to various embodiments, a mechanical switch with scissors construction keys (for example for a laptop) may be provided.

According to various embodiments, a mechanical switch may be provided in a laptop keyboard, and a scissors construction key may be provided (in other words: seated) on top of the mechanical key to give a mechanical and positive feel without degrading the key press experience. The scissors construction according to various embodiments ensures that the key top can be pressed at any location with consistent feel, without jamming of the keys. At the same time, there is no compromise to the form factor of the laptop, i.e. it has a slim profile.

Figure 1A:
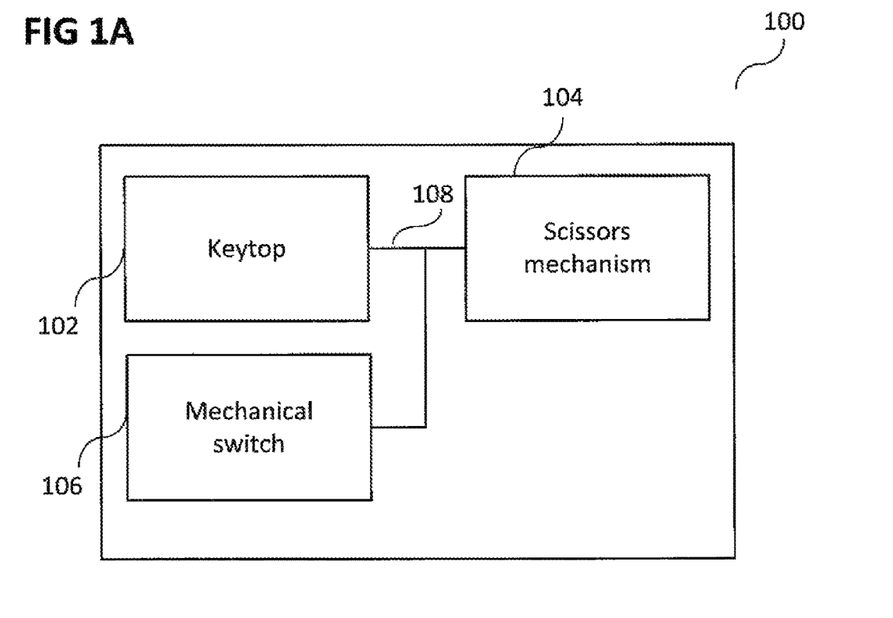
FIG. 1A shows a depressible key according to various embodiments.

FIG. 1A shows a depressible key 100 according to various embodiments. The depressible key 100 may include a keytop 102. The depressible key 100 may further include a scissors mechanism 104 connected to the keytop 102. The depressible key 100 may further include a mechanical switch 106 connected to the scissors mechanism 104. The keytop 102, the scissors mechanism 104, and the mechanical switch 106 may be connected with each other, for example like described above, and like illustrated by lines 108.

In other words, according to various embodiments, a key which includes a scissor mechanism and a mechanical switch may be provided. It will be understood that a mechanical switch is a switch with provides information about whether the switch is depressed or not based on a plunger of the mechanical switch being depressed (in contrast to two membranes or a rubber dome being depressed in non-mechanical switches).

It will be understood that a mechanical switch may for example be a switch which is defined as a module or a stand-alone switch with mechanical action. The action of a mechanical switch of depressing and returning to the original position may be by a spring which is inside the body of the switch. The spring may be a linear coil spring, or a leaf spring. Mechanical switches may come in various configurations, shapes, and sizes. Mechanical switches may be provided in a DIP (dual in-line package) thru (through) hole configuration or in a SMT (surface-mount technology) configuration. Mechanical switches may have a mechanical feel or may be provided without a mechanical feel. Mechanical switches may have a click sound or may be provided without a click sound to send a positive response to the user.

According to various embodiments, the scissors mechanism 104 may include a first scissors leg. A first end of the first scissors leg may be connected proximal to an edge of the keytop 102. A portion of the mechanical switch distal to the edge of the keytop 102 may be connected to a second end of the first scissors leg.

Figure 1B:
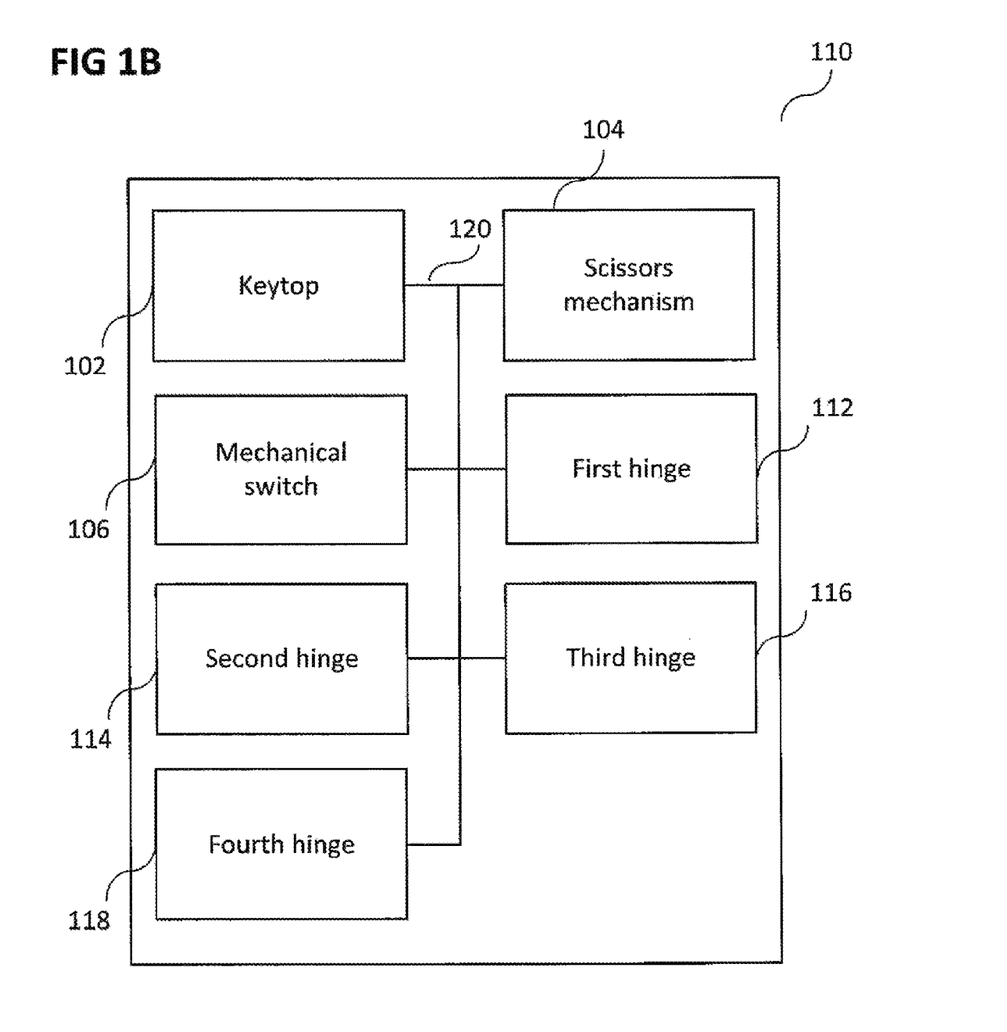
FIG. 1B shows a depressible key according to various embodiments.

FIG. 1B shows a depressible key 110 according to various embodiments. The depressible key 110 may, similar to the depressible key 100 of FIG. 1A, include a keytop 102. The depressible key 110 may, similar to the depressible key 100 of FIG. 1A, further include a scissors mechanism 104 connected to the keytop 102. The depressible key 110 may, similar to the depressible key 100 of FIG. 1A, further include a mechanical switch 106 connected to the scissors mechanism 104. The depressible key 110 may further include a first hinge 112, like will be described in more detail below. The depressible key 110 may further include a second hinge 114, like will be described in more detail below. The depressible key 110 may further include a third hinge 116, like will be described in more detail below. The depressible key 110 may further include a fourth hinge 118, like will be described in more detail below. The keytop 102, the scissors mechanism 104, the mechanical switch 106, the first hinge 112, the second hinge 114, the third hinge 116, and the fourth hinge 118, may be connected with each other, for example mechanically connected, like illustrated by lines 120.

According to various embodiments, the first end of the first scissors leg may be connected proximal to the edge of the keytop 102 using the first hinge 112.

According to various embodiments, the portion of the mechanical switch 102 distal to the edge of the keytop 102 may be connected to the second end of the first scissors leg using the second hinge 114.

According to various embodiments, the scissors mechanism 104 may include a first further scissors leg provided at least substantially parallel to the first scissors leg.

According to various embodiments, the first scissors leg and the first further scissors leg may be provided as an integral piece (in other word: one-pieced).

According to various embodiments, the scissors mechanism 104 may include a second scissors leg. A first end of the second scissors leg may be connected distal to the edge of the keytop 102. A portion of the mechanical switch 106 proximal to the edge of the keytop 102 is connected to a second end of the second scissors leg. With this connection structure, the first scissors leg and the second scissors leg may be provided at least substantially in an "x" shape.

According to various embodiments, the first end of the second scissors leg may be connected distal to the edge of the keytop 102 using the third hinge 114.

According to various embodiments, the portion of the mechanical switch 106 proximal to the edge of the keytop 102 may be connected to the second end of the second scissors leg using the fourth hinge 116.

According to various embodiments, the scissors mechanism 104 may include a second further scissors leg provided at least substantially parallel to the second scissors leg.

According to various embodiments, the second scissors leg and the second further scissors leg may be provided as an integral piece.

According to various embodiments, the first scissors leg and the second scissors leg may be connected via a first further hinge (which may be a part of the depressible key, and which may for example be provided at least substantially at a center (or middle) portion of both the first scissors leg and the second scissors leg).

According to various embodiments, the first further scissors leg and the second further scissors leg are connected via a second further hinge (which may be a part of the depressible key, and which may for example be provided at least substantially at a center (or middle) portion of both the first further scissors leg and the second further scissors leg).

According to various embodiments, the mechanical switch 106 may be connected to the scissors mechanism 104 via a casing of the mechanical switch 102.

Figure 1C:
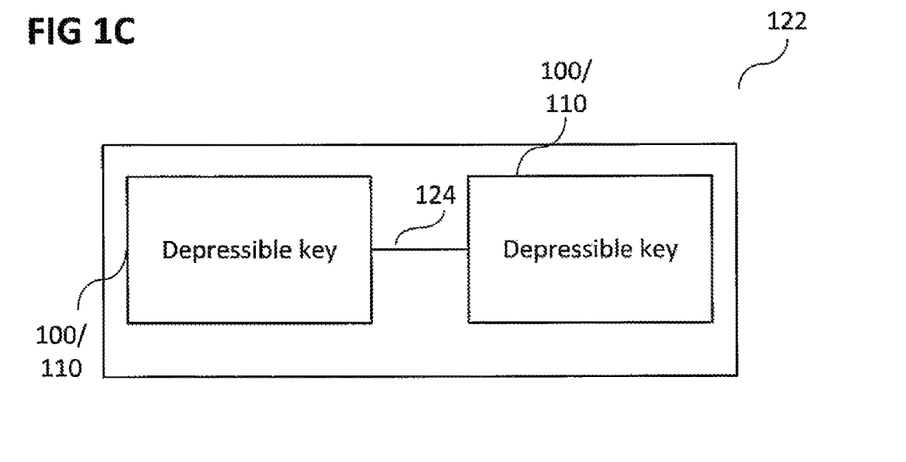
FIG. 1C shows a keyboard according to various embodiments.

FIG. 1C shows a keyboard 122 according to various embodiments. The keyboard 122 may include a plurality of depressible keys (for example depressible keys 100 or 110, like described above). The depressible keys 100/110 may be connected, for example electrically connected or mechanically connected, like illustrated by line 124. It will be understood that although two depressible keys 100/110 are shown in FIG. 1C for illustrative purposes, the keyboard 122 may include any number of depressible keys 100/110. For example all keys of the keyboard 122 may be depressible keys 100/110.

According to various embodiments, the mechanical switch 106 may be connected to the scissors mechanism via a portion of the keyboard 122 external to the mechanical switch 106.

According to various embodiments, the keyboard 122 may be a standalone keyboard.

According to various embodiments, the keyboard 122 may be provided in at least one of a laptop computer or a tablet computer.

According to various embodiments, the key press feeling may be consistent when pressing on different positions on the keytop.

According to various embodiments, there may be provided dual advantages of a keyboard with mechanical, yet consistent feel across the surface of the keytop.

According to various embodiments, the scissor mechanism may be provided on top of a mechanical switch, whereby a pair of portions of legs from the scissors attaches to the underside of the keys, while a lower pair of portions of the scissor legs rests on an anchor plate beneath the switch mechanism. Thus, when the key is depressed, the scissor collapses on the switch mechanism, which provides a more mechanical feedback than the mushy feel of just the rubber dome.

Figure 2:
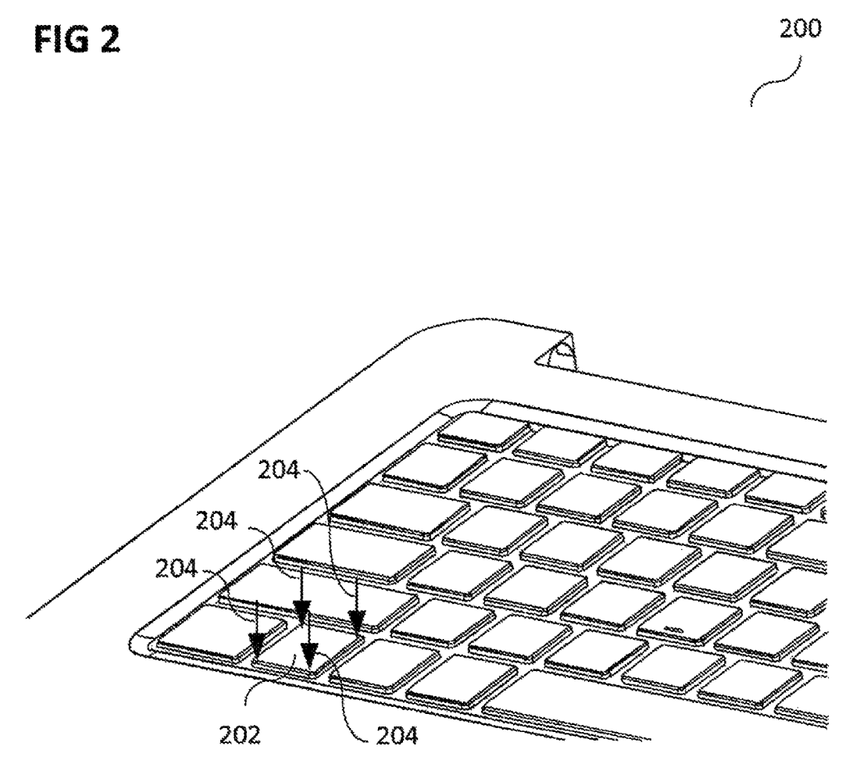
FIG. 2 shows an illustration of a portion of a keyboard according to various embodiments.

FIG. 2 shows an illustration 200 of a portion of a keyboard according to various embodiments. Like illustrated by arrows 204, when depressing a keytop 202 of a key (for example of a depressible key 100 of FIG. 1A or of a depressible key 110 of FIG. 1B), the forces are equally distributed amongst the corners of the keytop 202.

Figure 3A:
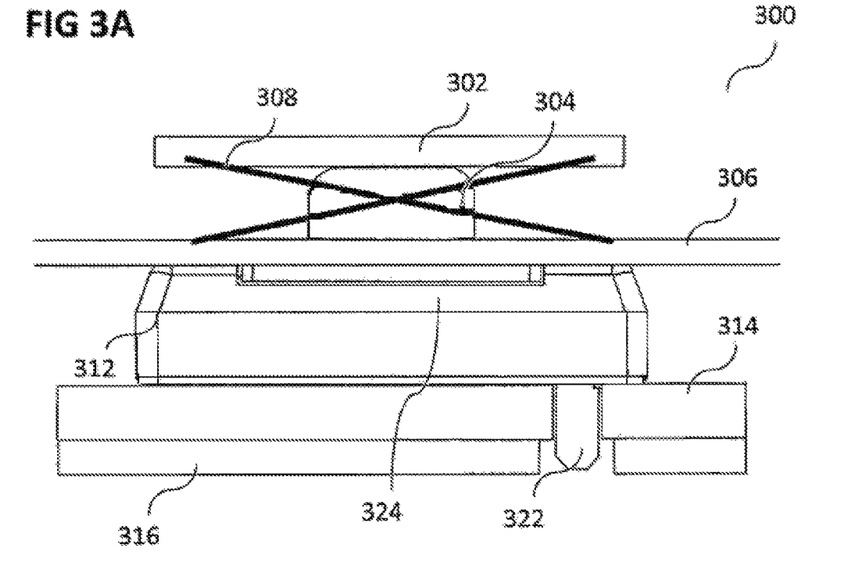
FIG. 3A shows an illustration of a cross-sectional view of a key according to various embodiments.

FIG. 3A shows an illustration 300 of a cross-sectional view of a key (for example a depressible key) according to various embodiments, which may use a switch, for example a mechanical switch. A keytop 302, a key plunger 304, an anchor plate 306 (in other words: the scissors key construction anchor plate), a first scissors leg 308, a second scissors leg 310, a lower portion 312 of a casing of the switch, and a top portion 324 of the casing of the switch are shown. A PCB 314 (printed circuit board) may be provided below the lower portion 312 of the casing of the switch (in other words: the switch may be provided on a PCB 314. An insulator 316 (for example an insulator layer; for example provided with an adhesive) may be provided below the PCB 314. A terminal 322 (for example a lead) for (in other words: of) the switch may provide contact to the switch trough the PCB 314 and insulator 316. In FIG. 3A, a DIP (dual in-line package) version of a key according to various embodiments is shown.

The anchor plate 306 (which for example may be a metal plate) may seat on the topcasing (in other words: the top portion 324 of the casing) of the switch. The anchor plate 306 may also be referred to as scissors key construction anchor plate.

One end of each leg 308, 310 of the scissors structure seats on the anchor plate 306, while the other end of each leg is 308, 310 attached to the underside of the keytop 302.

Figure 3B:
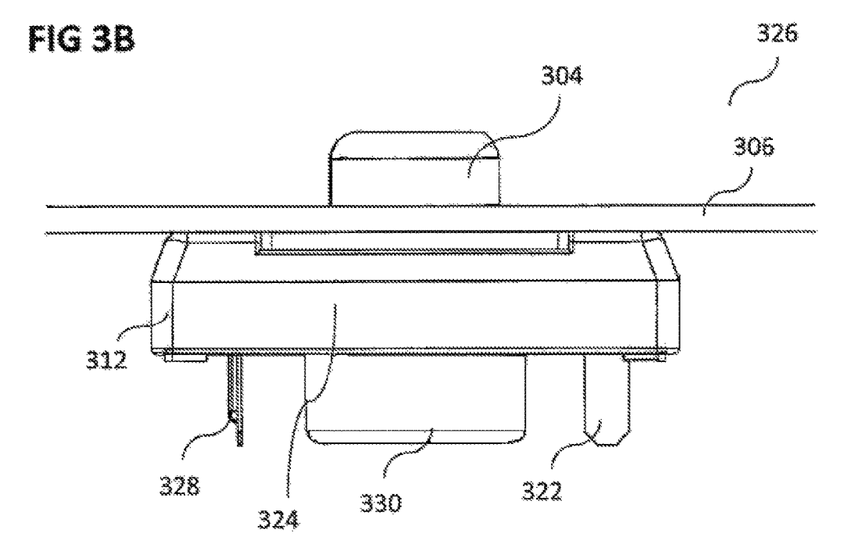
FIG. 3B shows an illustration of a cross-sectional view of various portions of the key shown in FIG. 3A according to various embodiments.

FIG. 3B shows an illustration 326 of a cross-sectional view of various portions of the key shown in FIG. 3A according to various embodiments. Various elements shown in FIG. 3B may be similar or identical to elements shown in FIG. 3A, so that the same reference signs may be used and duplicate description may be omitted. A terminal 328 may be similar to terminal 322 shown in FIG. 3A, but may be rotated by 90 degrees compared to terminal 322. A part 330 (in other words: a portion) of the switch body 324 may extend below the PCB level to save space. It will be understood that FIG. 3B is similar to FIG. 3A, without the PCB 314 and insulator 316, hence exposing the portion 330 of the switch body 324, and another terminal 328.

Figure 3C:
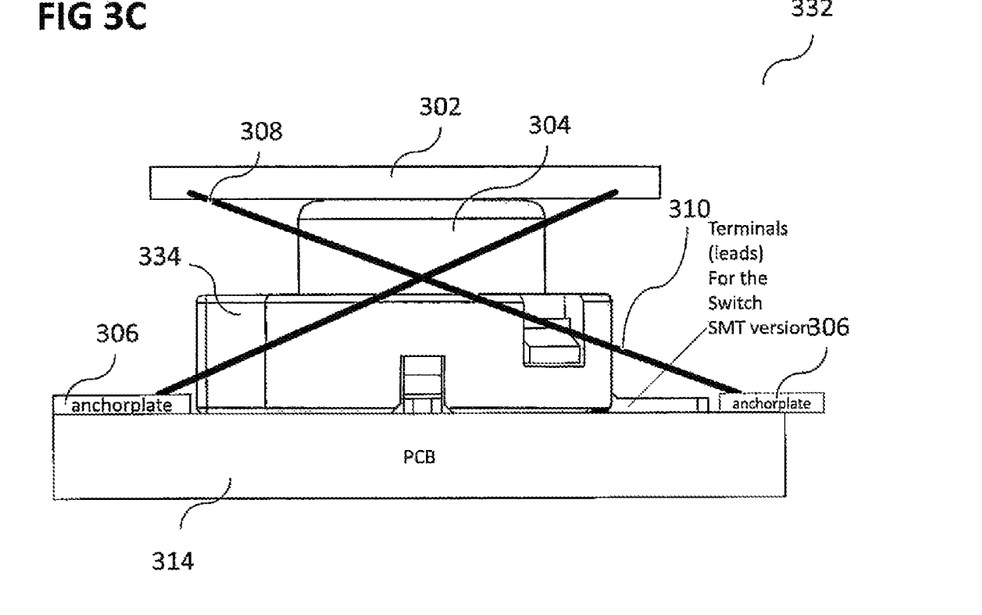
FIG. 3C shows an illustration of a surface-mount technology version of a key (for example a depressible key) according to various embodiments.

FIG. 3C shows an illustration 332 of a surface-mount technology (SMT) version of a key (for example a depressible key) according to various embodiments. Various elements of the key shown in FIG. 3C may be similar or identical to elements shown in FIG. 3A, so that the same reference signs may be used and duplicate description may be omitted. A main body 334 of the mechanical switch is shown.

Figure 3D:
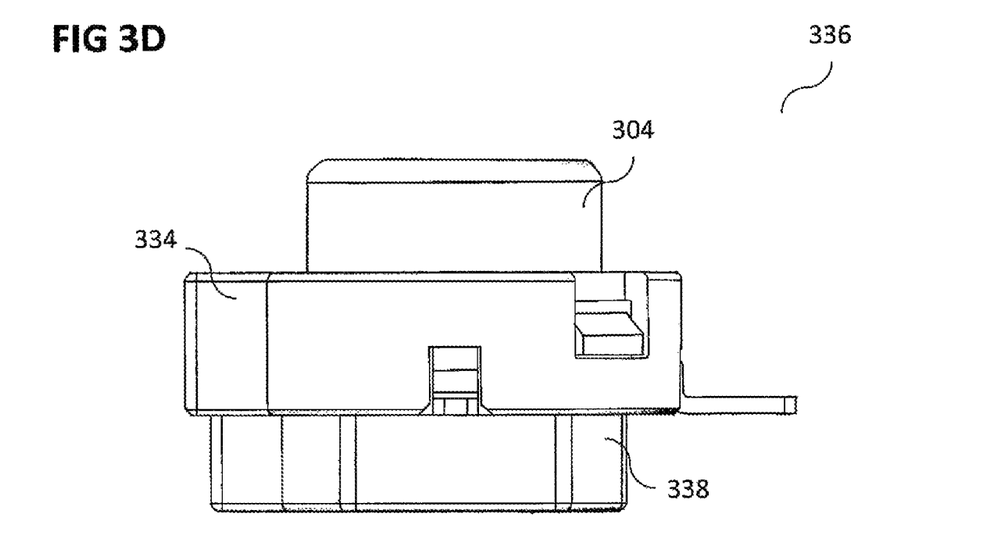
FIG. 3D shows an illustration of a cross-sectional view of various portions of the key shown in FIG. 3C according to various embodiments.

FIG. 3D shows an illustration 336 of a cross-sectional view of various portions of the key shown in FIG. 3C according to various embodiments. Various elements shown in FIG. 3D may be similar or identical to elements shown in FIG. 3C, so that the same reference signs may be used and duplicate description may be omitted. A part 338 (in other words: a portion) of the body 334 may extend below the PCB level; according to various embodiments, this may save space.

Figure 4A:
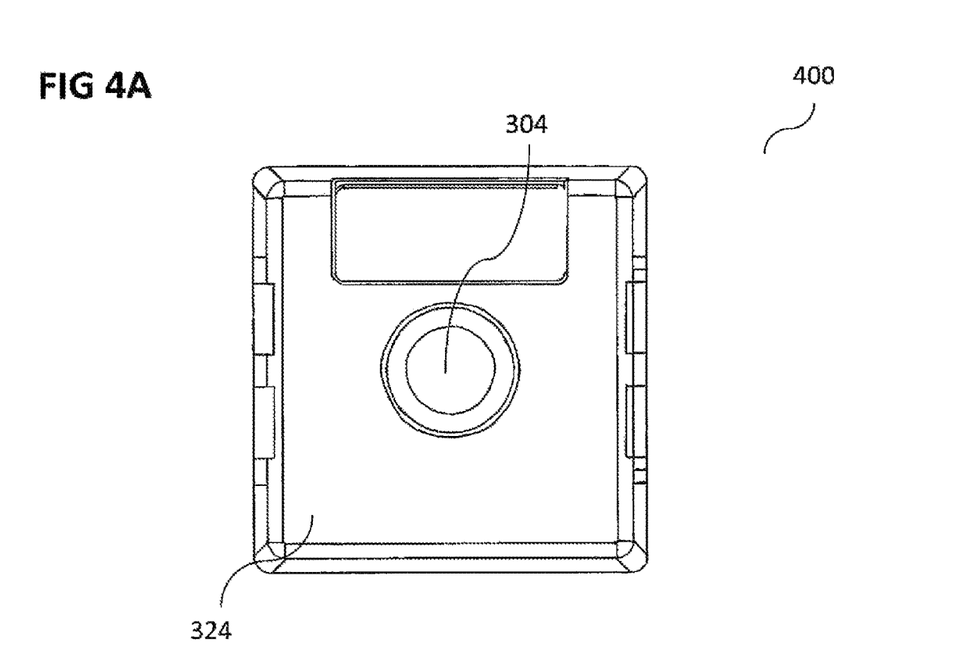
FIG. 4A shows an illustration of a top view of a key according to various embodiments.

FIG. 4A shows an illustration 400 of a top view of a key (for example a depressible key) according to various embodiments. Various elements shown in FIG. 4 may be similar or identical to elements shown in FIG. 3, so that the same reference signs may be used and duplicate description may be omitted. The actuator 304 of the switch (i.e. the moving part that switches on and off) and (for example the top part of) the body of the switch 324 (in other words: the switch body) are shown.

Figure 4B:
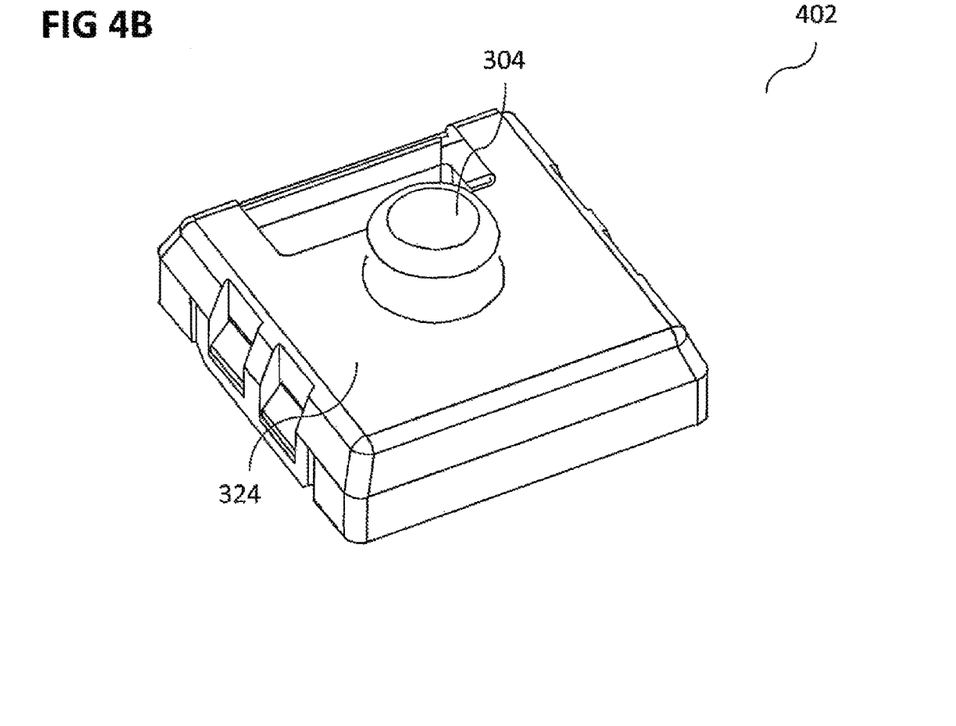
FIG. 4B shows an iso (isometric) view of the key shown in FIG. 4A according to various embodiments.

FIG. 4B shows an iso (isometric) view 402 of the key shown in FIG. 4A according to various embodiments. Various elements shown in FIG. 4B may be similar or identical to elements shown in FIG. 4A, so that the same reference signs may be used and duplicate description may be omitted.

Figure 4C:
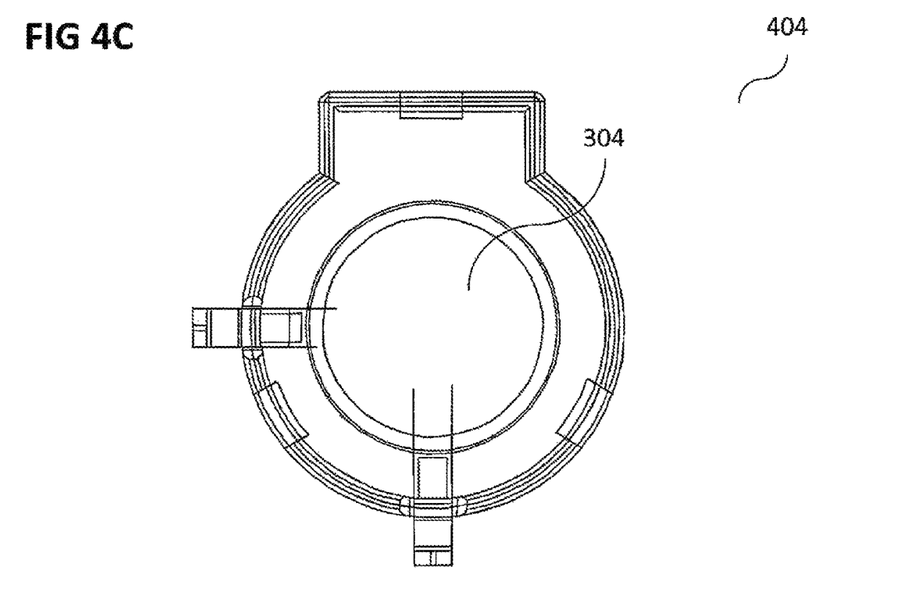
FIG. 4C shows a top view of a further embodiment of the switch.

FIG. 4C shows a top view 404 of a further embodiment of the switch. Various elements shown in FIG. 4C may be similar or identical to elements shown in FIG. 4A, so that the same reference signs may be used and duplicate description may be omitted. The body of the switch shown in FIG. 4C may be round. The terminals of the switch shown in FIG. 4C may be DIP provided in a thru (through) hole version.

Figure 4D:
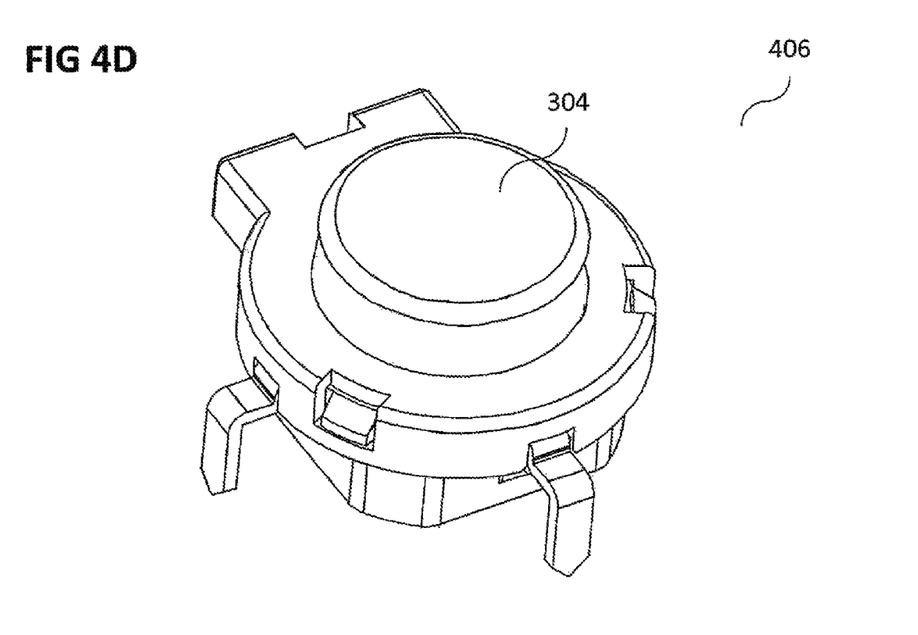
FIG. 4D shows an iso (isometric) view of the key shown in FIG. 4C according to various embodiments.

FIG. 4D shows an iso (isometric) view 406 of the key shown in FIG. 4C according to various embodiments. Various elements shown in FIG. 4D may be similar or identical to elements shown in FIG. 4C, so that the same reference signs may be used and duplicate description may be omitted.

Figure 4E:
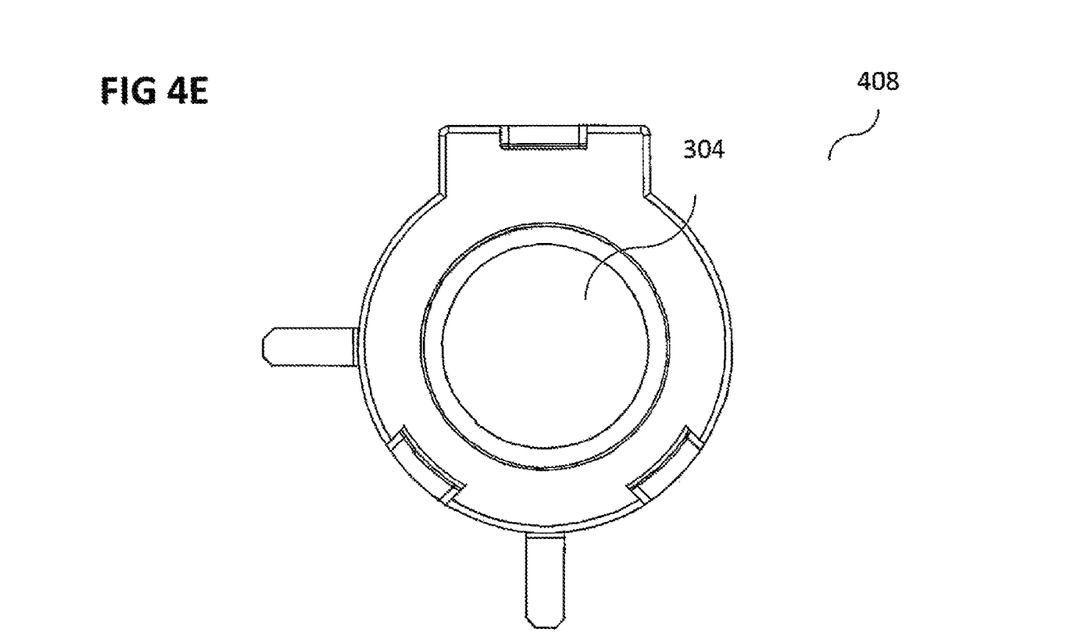
FIG. 4E shows a top view of a further embodiment of the switch.

FIG. 4E shows a top view 408 of a further embodiment of the switch. Various elements shown in FIG. 4E may be similar or identical to elements shown in FIG. 4A or FIG. 4C, so that the same reference signs may be used and duplicate description may be omitted. The terminals of the switch shown in FIG. 4E may be provided in a SMT version.

Figure 4F:
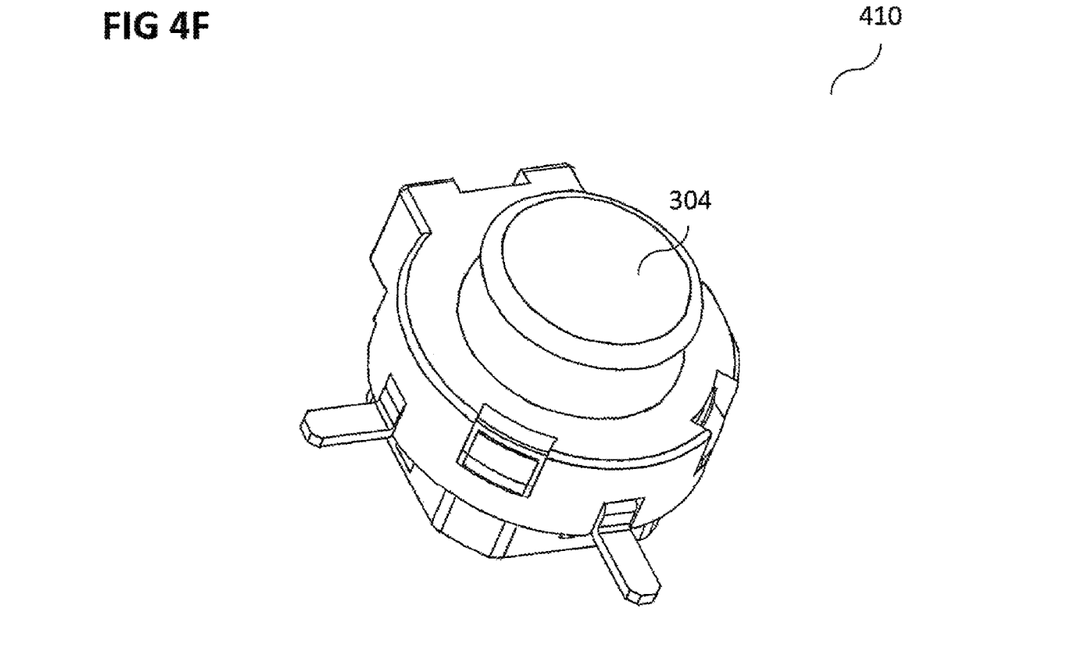
FIG. 4F shows an iso (isometric) view of the key shown in FIG. 4E according to various embodiments.

FIG. 4F shows an iso (isometric) view 410 of the key shown in FIG. 4E according to various embodiments. Various elements shown in FIG. 4F may be similar or identical to elements shown in FIG. 4E, so that the same reference signs may be used and duplicate description may be omitted.

Figure 5:
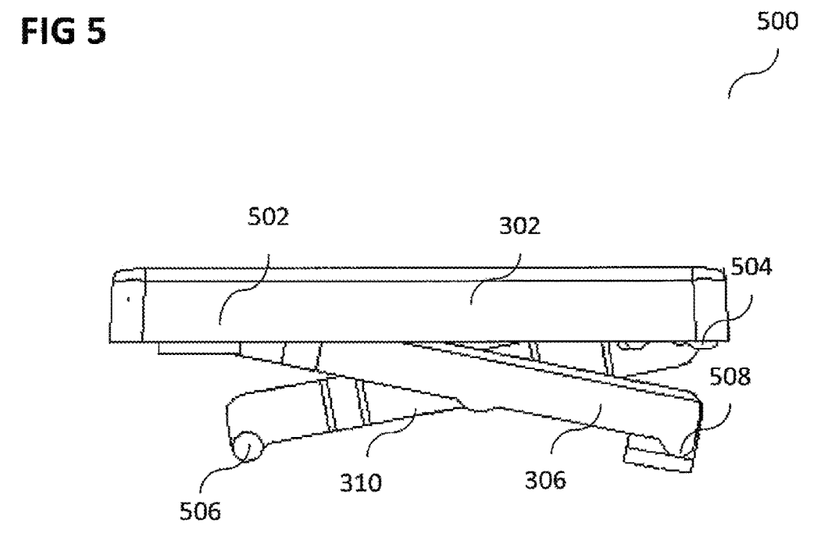
FIG. 5 shows an illustration of a cross-section of a scissors mechanism according to various embodiments.

FIG. 5 shows an illustration 500 of a cross-section of a scissors mechanism according to various embodiments. Various elements shown in FIG. 4 may be similar or identical to elements shown in FIG. 3, so that the same reference signs may be used and duplicate description may be omitted. Furthermore, a first hinge 502 (corresponding to the first hinge 112 shown in FIG. 1B), a second 504 (corresponding to the second hinge 114 shown in FIG. 1B), a third hinge 506 (corresponding to the third hinge 116 shown in FIG. 1B), and a fourth hinge 508 (corresponding to the fourth hinge 118 shown in FIG. 1B) are shown.

Figure 6:
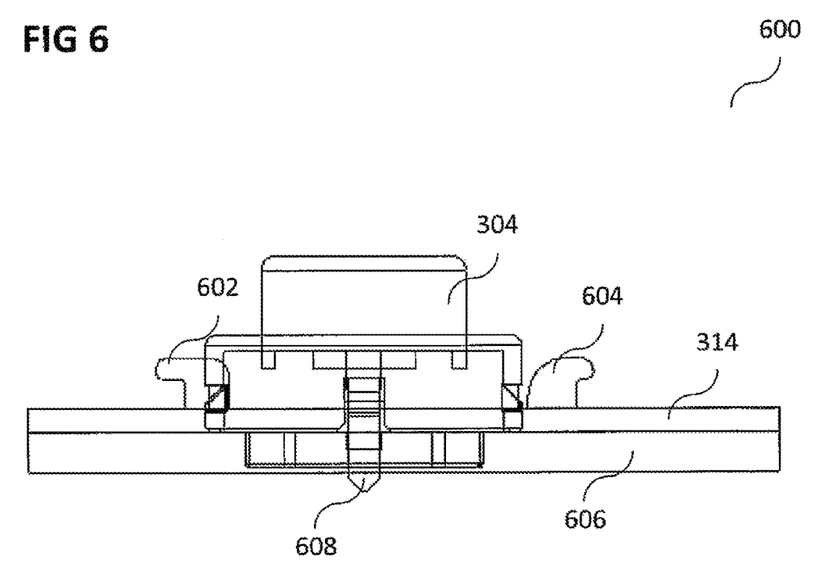
FIG. 6 shows an illustration of a cross-section of a mechanical switch according to various embodiments.

FIG. 6 shows an illustration 600 of a cross-section of a mechanical switch according to various embodiments. Various elements shown in FIG. 6 may be similar or identical to elements shown in FIG. 3, so that the same reference signs may be used and duplicate description may be omitted. Anchor metal plates 602, 604 for the scissors linkage (for example steel plates), a PCB 606, and terminals leads 608 of the mechanical switch are shown.

Figure 7:
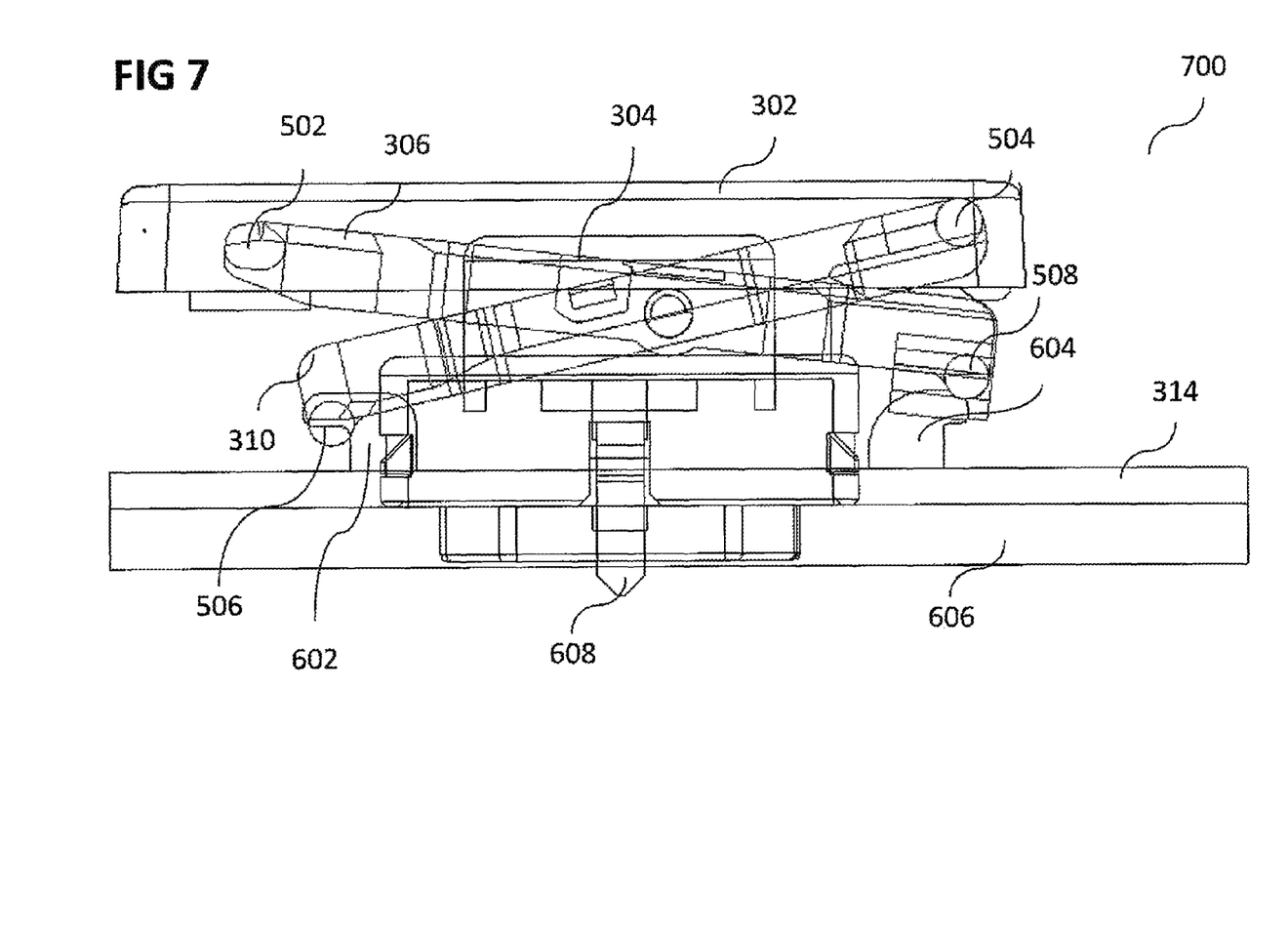
FIG. 7 shows an illustration of a cross-section of a depressible key according to various embodiments.

FIG. 7 shows an illustration 700 of a cross-section of a depressible key according to various embodiments. Various elements shown in FIG. 7 may be similar or identical to elements shown in FIG. 3, FIG. 5, and FIG. 6, so that the same reference signs may be used and duplicate description may be omitted.

It will be understood that the depressible key according to various embodiments may be pushed back to the original upward position by a spring inside the switch.

By utilizing a mechanical switch may give a mechanical switch feel on the notebook computer. According to various embodiments, by incorporating a scissors key construction over the top of the switch, the key press feel may be consistent across all the surface of the key. Hence, according to various embodiments, there are dual advantages of a keyboard with mechanical, yet consistent feel across the surface of the keytop.

According to various embodiments, a laptop computer, a tablet keyboard, and/or a standalone keyboard may be provided with the depressible key according to various embodiments.

The following examples pertain to further embodiments.

Example 1 is a depressible key comprising: a keytop; a scissors mechanism connected to the keytop; and a mechanical switch connected to the scissors mechanism.

In example 2, the subject-matter of example 1 can optionally include that the scissors mechanism comprises a first scissors leg; wherein a first end of the first scissors leg is connected proximal to an edge of the keytop; and wherein a portion of the mechanical switch distal to the edge of the keytop is connected to a second end of the first scissors leg.

In example 3, the subject-matter of example 2 can optionally include: a first hinge; wherein the first end of the first scissors leg is connected proximal to the edge of the keytop using the first hinge.

In example 4, the subject-matter of any one of examples 2 to 3 can optionally include: a second hinge; wherein the portion of the mechanical switch distal to the edge of the keytop is connected to the second end of the first scissors leg using the second hinge.

In example 5, the subject-matter of any one of examples 2 to 4 can optionally include that the scissors mechanism comprises a first further scissors leg provided at least substantially parallel to the first scissors leg.

In example 6, the subject-matter of example 5 can optionally include that the first scissors leg and the first further scissors leg are provided as an integral piece.

In example 7, the subject-matter of any one of examples 2 to 6 can optionally include that the scissors mechanism comprises a second scissors leg; wherein a first end of the second scissors leg is connected distal to the edge of the keytop; and wherein a portion of the mechanical switch proximal to the edge of the keytop is connected to a second end of the second scissors leg.

In example 8, the subject-matter of example 7 can optionally include: a third hinge; wherein the first end of the second scissors leg is connected distal to the edge of the keytop using the third hinge.

In example 9, the subject-matter of any one of examples 7 to 8 can optionally include: a fourth hinge; wherein the portion of the mechanical switch proximal to the edge of the keytop is connected to the second end of the second scissors leg using the fourth hinge.

In example 10, the subject-matter of any one of examples 7 to 9 can optionally include that the scissors mechanism comprises a second further scissors leg provided at least substantially parallel to the second scissors leg.

In example 11, the subject-matter of example 10 can optionally include that the second scissors leg and the second further scissors leg are provided as an integral piece.

In example 12, the subject-matter of any one of examples 7 to 11 can optionally include that the first scissors leg and the second scissors leg are connected via a first further hinge.

In example 13, the subject-matter of any one of examples 1 to 12 can optionally include that the mechanical switch is connected to the scissors mechanism via a casing of the mechanical switch.

Example 14 is a keyboard comprising: a plurality of depressible keys of any one of examples 1 to 13.

In example 15, the subject-matter of example 14 can optionally include that the mechanical switch is connected to the scissors mechanism via a portion of the keyboard external to the mechanical switch.

In example 16, the subject-matter of any one of examples 14 to 15 can optionally include that the keyboard is a standalone keyboard.

In example 17, the subject-matter of any one of examples 14 to 16 can optionally include that the keyboard is provided in at least one of a laptop computer or a tablet computer.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A depressible key comprising:
a keytop;
a scissors mechanism connected to the keytop; and
a mechanical switch connected to the scissors mechanism, the mechanical switch comprising a depressible plunger and a spring for depressing the mechanical switch and returning the mechanical switch to an original position;
wherein the scissors mechanism is arranged on top of the mechanical switch and configured to collapse on the mechanical switch when the keytop is depressed, wherein the keytop actuates the mechanical switch by directly depressing the depressible plunger when the keytop is depressed.

2. The depressible key of claim 1,
wherein the scissors mechanism comprises a first scissors leg;
wherein a first end of the first scissors leg is connected proximal to an edge of the keytop; and
wherein a portion of the mechanical switch distal to the edge of the keytop is connected to a second end of the first scissors leg.

3. The depressible key of claim 2, further comprising:
a first hinge;
wherein the first end of the first scissors leg is connected proximal to the edge of the keytop using the first hinge.

4. The depressible key of claim 2, further comprising:
a second hinge;
wherein the portion of the mechanical switch distal to the edge of the keytop is connected to the second end of the first scissors leg using the second hinge.

5. The depressible key of claim 2,
wherein the scissors mechanism comprises a first further scissors leg provided at least substantially parallel to the first scissors leg.

6. The depressible key of claim 5,
wherein the first scissors leg and the first further scissors leg are provided as an integral piece.

7. The depressible key of claim 2,
wherein the scissors mechanism comprises a second scissors leg;
wherein a first end of the second scissors leg is connected distal to the edge of the keytop; and
wherein a portion of the mechanical switch proximal to the edge of the keytop is connected to a second end of the second scissors leg.

8. The depressible key of claim 7, further comprising:
a third hinge;
wherein the first end of the second scissors leg is connected distal to the edge of the keytop using the third hinge.

9. The depressible key of claim 7, further comprising:
a fourth hinge;
wherein the portion of the mechanical switch proximal to the edge of the keytop is connected to the second end of the second scissors leg using the fourth hinge.

10. The depressible key of claim 7,
wherein the scissors mechanism comprises a second further scissors leg provided at least substantially parallel to the second scissors leg.

11. The depressible key of claim 10,
wherein the second scissors leg and the second further scissors leg are provided as an integral piece.

12. The depressible key of claim 7,
wherein the first scissors leg and the second scissors leg are connected via a first further hinge.

13. The depressible key of claim 1,
wherein the mechanical switch is connected to the scissors mechanism via a casing of the mechanical switch.

14. The depressible key of claim 1, further comprising:
an anchor plate on a casing of the mechanical switch;
wherein the scissors mechanism is connected to the keytop at a first end of the scissors mechanism; and
wherein a second end of the scissors mechanism seats on the anchor plate.

15. A keyboard comprising:
a plurality of depressible keys, each of the plurality of depressible keys including:
a keytop;
a scissors mechanism connected to the keytop; and
a mechanical switch connected to the scissors mechanism, the mechanical switch comprising a depressible plunger and a spring for depressing the mechanical switch and returning the mechanical switch to an original position;
wherein the scissors mechanism is arranged on top of the mechanical switch and configured to collapse on the mechanical switch when the keytop is depressed, wherein the keytop actuates the mechanical switch by directly depressing the depressible plunger when the keytop is depressed.

16. The keyboard of claim 15,
wherein the mechanical switch is connected to the scissors mechanism via a portion of the keyboard external to the mechanical switch.

17. The keyboard of claim 15,
wherein the keyboard is a standalone keyboard.

18. The keyboard of claim 15,
wherein the keyboard is provided in at least one of a laptop computer or a tablet computer.

* * * * *